United States Patent
Schoen et al.

(10) Patent No.: US 9,751,637 B2
(45) Date of Patent: Sep. 5, 2017

(54) EXTERIOR HELICOPTER LIGHT UNIT AND METHOD OF OPERATING AN EXTERIOR HELICOPTER LIGHT UNIT

(71) Applicant: Goodrich Lighting Systems GmbH, Lippstadt (DE)

(72) Inventors: Christian Schoen, Mainz (DE); Andre Hessling Von Heimendahl, Koblenz (DE)

(73) Assignee: GOODRICH LIGHTING SYSTEMS GMBH, Lippstadt (DE)

( * ) Notice: Subject to any disclaimer, the term of this patent is extended or adjusted under 35 U.S.C. 154(b) by 462 days.

(21) Appl. No.: 14/337,261

(22) Filed: Jul. 22, 2014

(65) Prior Publication Data
US 2015/0036365 A1 Feb. 5, 2015

(30) Foreign Application Priority Data
Jul. 30, 2013 (EP) ..................................... 13178590

(51) Int. Cl.
*B64D 47/06* (2006.01)
*B64D 47/04* (2006.01)
*B60Q 1/24* (2006.01)

(52) U.S. Cl.
CPC ............. *B64D 47/06* (2013.01); *B60Q 1/245* (2013.01); *B64D 47/04* (2013.01)

(58) Field of Classification Search
CPC ................................. B60Q 1/245; F21V 14/00
See application file for complete search history.

(56) References Cited

U.S. PATENT DOCUMENTS

| 4,115,841 A * | 9/1978 | Alexander | F21S 8/003 362/44 |
| 2005/0047142 A1* | 3/2005 | Lui | B60Q 1/245 362/275 |

FOREIGN PATENT DOCUMENTS

| CA | 2466518 | 5/2003 |
| EP | 1152921 | 11/2001 |
| FR | 2608995 | 7/1988 |
| FR | 2978425 | 2/2013 |
| GB | 1350618 | 4/1974 |
| WO | 0049331 | 8/2000 |
| WO | 03039957 A1 | 5/2003 |

OTHER PUBLICATIONS

European Search Report for Application No. 13178590.9-1754. Mailed Jan. 22, 2014. 5 pages.

* cited by examiner

*Primary Examiner* — Anabel Ton
(74) *Attorney, Agent, or Firm* — Cantor Colburn LLP

(57) ABSTRACT

An exterior helicopter light unit is disclosed that comprises a movable light head comprising a light source, a first motor and a second motor for actuating the movable light head, and an inverse differential gear assembly coupling the first and second motors to the movable light head in such a way that the first and second motors can tilt and rotate the movable light head in operation.

17 Claims, 2 Drawing Sheets

EXTERIOR HELICOPTER LIGHT UNIT AND METHOD OF OPERATING AN EXTERIOR HELICOPTER LIGHT UNIT

CROSS REFERENCE TO RELATED APPLICATIONS

This application claims priority to European Patent Application No. 13 178 590.9 filed Jul. 30, 2013, the entire contents of which is incorporated herein by reference.

FIELD OF TECHNOLOGY

The invention relates to lighting systems of helicopters. In particular, it relates to exterior helicopter light units. More in particular, it relates to search and landing lights of helicopters.

BACKGROUND

Helicopters commonly have movable lights. The direction of the light beam of such movable lights can be altered, for example for exploring the environment of the helicopter. Such movable lights are particularly useful in scenarios where the helicopter pilot or crew wants to search the environment or wants to inspect the landing ground. Common light units have a light head, which includes the light source and is mounted on the distal end of an arm-like structure extending away from the helicopter body. Such light units have a motor for tilting the arm-like structure, provided at the helicopter-near end of the arm-like structure, and a motor for rotating the light head, provided in close proximity to the light head on the arm-like structure. The two motors allow for altering the direction of the light beam of the light source, as desired by the pilot or crew. The structures of such common light units are bulky and heavy. This poses problems when moving the light head, in particular in adverse conditions, such as in icy or windy conditions.

Accordingly, it would be beneficial to provide an exterior helicopter light unit that has an improved movability of the light head. Further, it would be beneficial to provide a method of operating such an exterior helicopter light unit.

SUMMARY

Exemplary embodiments of the invention include an exterior helicopter light unit that has a movable light head comprising a light source, a first motor and a second motor for actuating the movable light head, and an inverse differential gear assembly coupling the first and second motors to the movable light head in such a way that the first and second motors can tilt and rotate the movable light head in operation.

In this way, an exterior helicopter light unit is provided that does not need a motor in close proximity to the light head. In particular, the light head itself and its mounting structure, such as a light arm, can be entirely freed of the bulky and heavy motor. In other words, all actuator devices may be placed outside the movable part of the light unit with this set-up. Accordingly, the movable light head and its mounting structure are lighter and can be moved with less force. The motors themselves can be dimensioned smaller, resulting in lighter motor and gear assemblies. Also, the forces required in adverse conditions are smaller due to the lighter structure of the light head and mounting structure. For example, if the light head is stuck in a certain position due to icing, the forces for breaking the light head free are reduced as compared to the heavier light heads and arms of the prior art. Also, the reduced weight is advantageous in high wind conditions. The motors do not have to move as much weight against high wind loads, resulting in reduced force/torque requirements.

The elimination of the motor from the light arm provides additional degrees of freedom for designing the light head and light arm. Not having to account for the heavy and bulky motor device provides more flexibility with respect to weight, arrangement and geometrical design of the light head.

Above described structure also allows for adding up the torque of the first and second motors for both the tilting and the rotating of the light head. The inverse differential gear assembly allows for combining the torque of the two motors, while providing the functionality of both the tilting of the light head and the rotation of the light head. Due to its inherent design as a differential gear assembly, the inverse differential gear assembly allows for providing two different kinds of motions for the light head.

According to a further embodiment, the inverse differential gear assembly comprises a carrier structure, a first input gear and a second input gear, each rotatably coupled to the carrier structure, with the first motor being drivingly coupled to the first input gear and the second motor being drivingly coupled to the second input gear, and a connection structure, rotatably coupled to the carrier structure and coupling the first and second input gears to each other, with the movable light head being fixedly coupled to the connection structure. The carrier structure, the first and second input gears, and the connection structure are coupled in such a way that a rotation of the first and second input gears in the same direction results in a rotation of the carrier structure, tilting the movable light head, and that a rotation of the first and second input gears in opposite directions results in a rotation of the connection structure, rotating the movable light head.

In this way, the motors may co-operate particularly efficiently. On the one hand, rotating both the first input gear and the second input gear in opposite directions with the same rotational speed will result in a rotation of the connection structure, while the carrier structure keeps its position. In other words, the full torque of both motors is transmitted to the connection structure for rotating the light head. On the other hand, rotating both the first input gear and the second input gear in the same direction with the same rotational speed will result in a rotation of the carrier structure, while the connection structure keeps its position. In other words, the full torque of both motors is transmitted to the carrier structure for tilting the light head. For a given maximum torque requirement for tilting and/or rotating the light head, this summing of the torques of the two motors achieves that each of the two motors has to provide only a portion, such as for example 50%, of this maximum torque requirement. The torque and therefore size and weight of the motors can be reduced as compared to scenarios where one motor is provided for tilting and another motor is provided for rotating of the light head.

The term inverse differential gear assembly refers to differential gear assemblies similar to those used for example in cars and other fields of technology. It is denoted "inverse" differential gear assembly, because the motors of the present invention are coupled to those parts of the differential gear assembly that are commonly used as output elements of the differential gear assembly. In the example of an automotive differential gear, the element that is denoted carrier structure in the present application is usually the motor driven portion of the differential gear assembly, while the elements that are denoted first and second input gears in the present application are usually the output gears of the differential gear assembly, coupled to the axles of the car. In other words, the term "inverse" merely relates to the power flow direction through the differential gear, which is inverted as compared to usual uses, but does not imply particular constructional measures.

The term "rotatably coupled" refers to a situation where one element is coupled to another element in a fixed spatial relation, but is free to rotate with respect to the other element. In other words, no substantial lateral movements of the two elements take place, while relative rotation between the two elements is possible. In yet other words, the term "rotatably coupled" refers to a situation where the rotation of the one element does not necessarily result in a rotation of the other element and vice versa. The one element may be supported with respect to or mounted to the other element in a way that permits rotation, such as via a ball bearing.

The term "in a rotation transmission relationship" refers to a situation where one element is coupled to another element in such a way that the rotation of the one element results in the rotation of the other element. Accordingly, a rotation of the connection structure results in a rotation of the light head due to the rotation transmission relationship. This transmission of the rotation may be done via a fixed coupling between the light head and the connection structure, such as via a rotating light arm. It may alternatively be done via the light head and the connection structure both being rotatably coupled to a light head mounting structure. The rotation transmission between the connection structure and the light head may be gearless or geared.

The term "drivingly coupled" refers to a situation where one element is coupled in such a way to another element that the one element can drive the other element, in particular induce a rotation of the other element. The first and second motors in operation drive the first and second input gears.

The connection structure couples the first and second input gears to each other. It couples the first and second input gears in such a way that different rotation speeds of the first and second input gears result in a rotation of the connection structure. The coupling may be done in various ways of transmitting the rotation between mechanical elements. For this purpose, the first and second input gears and the connection structure may be in permanent engagement with each other.

The term movable light head refers to a light head whose orientation can be altered with respect to the helicopter, in particular with respect to the helicopter portion to which the light unit is mounted. With the inverse differential gear being interposed between the first and second motors and the movable light head, the movable light head is also movable with respect to the first and second motors. The first and second motors may be stationary with respect to the helicopter. According to a particular embodiment, the exterior helicopter light unit comprises a mounting plate, with the first and second motors being fixedly coupled to the mounting plate.

According to a further embodiment, the inverse differential gear assembly is a bevel differential gear assembly. In a particular embodiment, the carrier structure comprises a cage, the first input gear comprises a first bevel gear, the second input gear comprises a second bevel gear, and the connection structure comprises a third bevel gear, wherein the third bevel gear is in engagement with the first and second bevel gears. Such a bevel differential gear assembly comprises a low number of elements, in particular gears, such that it has a robust configuration. It also has a cage that is very suitable for supporting the weight of the light head and its mounting structure. In a particular embodiment, the carrier structure is the cage, such that the whole carrier structure only consists of one, robust element. Also, the connection structure may be the third bevel gear with a shaft. In this way, the whole connection structure only consists of one, easy to handle and easy to assembly element. Also, the coupling between the light head and the connection structure can be done in a non-complex manner, for example by fixedly coupling the shaft of the third bevel gear to the light head, either directly or via a light arm.

Other differential gear assemblies are possible as well. These include, but are not limited to ball differentials, differentials with multiple spur gears and differentials with multiple helical gears. In particular, the connection structure of the inverse differential gear assembly may be comprised of a plurality of spur gears or helical gears. In general, a variety of known differential gear assemblies are suitable for being used as the inverse differential gear assembly of the invention.

According to a further embodiment, the light unit comprises a light arm, to which the light head is mounted. In a particular embodiment, the movable light head is fixedly coupled to the connection structure via a light arm. In other words, the light unit comprises a light arm, with the light arm being fixedly coupled to the connection structure and with the light head being fixedly coupled to the light arm. In this way, the light arm and the light head are jointly movable. In other words, the rotating and tilting of the light head is in effect a rotating and tilting of the light arm and the light head together. The light arm is a lever for the light head. The rotation of the connection structure directly results in a rotation of the movable light head. The light arm in operation rotates with the connection structure. By providing the fixed coupling via the light arm, the light arm and light head can have a very simple structure. The light arm may only have the function of connecting the connection structure of the inverse differential gear assembly and the light head. The light head itself does not need to be connected to any other mechanical element than the light arm. No mechanical actuators need to be provided on the light arm. Of course, the light source of the light head has to be provided with electrical power in some way, either by a battery in the light head or by some power connection from the light head to the inside of the helicopter.

According to a further embodiment, the first motor is drivingly coupled to the first input gear via a first gear assembly and wherein the second motor is drivingly coupled to the second input gear via a second gear assembly. In this way, a gear stage can be provided between the motors and the input gears. According to a particular embodiment, the first gear assembly comprises a first worm, fixedly coupled to a motor shaft of the first motor, and a first spur gear, fixedly coupled to the first input gear and in engagement with the first worm, and the second gear assembly comprises a second worm, fixedly coupled to a motor shaft of the second motor, and a second spur gear, fixedly coupled to the second input gear and in engagement with the second worm. The worm and spur gear assemblies are an efficient way of transmitting the rotation of the respective motor shaft to the respective input gear of the inverse differential gear assembly. The spur gear may also be referred to as worm gear.

In the alternative, the motor shafts of the first and second motors may also be fixedly coupled to the first and second input gears, respectively. It is also possible that the first and second input gears and the motor shafts of the first and second motors are made from one piece, respectively. Also, other gear assemblies for drivingly coupling the first and second motors to the first and second input gears are possible. For example, the first and second gear assemblies may be bevel gear assemblies, with the motor shafts terminating in bevel gears and the motor-side ends of the shafts of the first and second input gears also terminating in bevel gears.

According to a further embodiment, the light unit may have a symmetric design. The symmetric design may include that the first motor and the second motors are identical motors. The term identical means in this context that the first and second motors have the same nominal performance characteristics. Due to production tolerances, their performance characteristics may deviate slightly. Providing identical motors allows for dimensioning the motors in such a way that the torque of each motor is 50% of the maximum torque requirement for tilting and/or rotating the movable light head. In this way, the power requirement, weight and size of the largest motor of the system can be minimized. This also allows for a symmetric loading of the components of the inverse differential gear assembly, reducing the wear and tear thereof. In a particular embodiment, the first and second input gears may also be identical.

According to a further embodiment, the first gear assembly and the second gear assembly may also be identical. This allows for the provision of a the whole driving arrangement from the motors to the input gears to be symmetric. In a particular embodiment, the first and second worms may be identical and the first and second spur gears may be identical.

According to a further embodiment, the first and second motors are servo motors. In this way, the rotating and the tilting of the movable light head may be controlled with high accuracy. Servo motors also allow for a locking of an exact position of the motor shafts and therefore of the movable light head.

According to a further embodiment, the exterior helicopter light unit further comprises at least one sensor adapted to detect the rotational position of at least one of the first input gear, the second input gear, the carrier structure, and the connection structure. In this way, the position of the movable light head may be sensed and fed back to a control unit, which in operation controls the first and second motors. In particular, the state of rotation and the tilting state of the movable light head may be determined. In a particular embodiment, two sensors may be provided. The sensors may be touchless proximity sensors. The two sensors may be arranged to detect the rotational positions of the two motor shafts or of the two input gears or of the carrier structure and the connection structure.

According to a further embodiment, the light unit may have a control unit adapted to control the first and second motors in operation. The control unit may receive direction commands for the light head from the pilot and/or crew or from automated on-board systems of the helicopter. It may also receive inputs from the positional sensors provided in the light unit for position feedback.

According to a further embodiment, a motor shaft of the first motor and a motor shaft of the second motor are substantially parallel, with the motor shaft of the first motor and the motor shaft of the second motor being parallel to a tilting plane, defined by a rotation axis of the connection structure in various tilting states. In a particular embodiment, a rotation axis of the first input gear and a rotation axis of the second input gear may be in a plane substantially orthogonal to the motor shafts of the first and second motors, respectively. The rotation axis of the first input gear may be in a first plane substantially orthogonal to the motor shaft of the first motor, while the rotation axis of the second input gear may be in a second plane, different from the first plane, substantially orthogonal to the motor shaft of the second motor. The rotation axes of the first and second input gears may also be in the same plane, substantially orthogonal to the motor shafts of the first and second motors. The term substantially orthogonal says that the respective plane does not have to be entirely orthogonal, the slight non-orthogonality being caused by production tolerances for example. The tilting plane is defined as the plane that includes the rotation axis of the connection structure across the different tilting states of the light head. For the case of the light head being mounted on a light arm, the tilting plane may alternatively be defined as the plane that includes the light arm in the various tilting states.

This orientation of the motor shafts, the rotation axes of the input gears and the rotation axis of the connection structure allows for a particularly compact design of the light unit. The transmission of the force/torque in right angles allows for very low friction losses and efficient power transfer. In this way, a particularly compact light unit with particularly good efficiency in moving the light head is achieved.

According to a further embodiment, the exterior helicopter light unit further comprises a mounting plate, with the first and second motors being fixedly mounted to the mounting plate and the inverse differential gear assembly being rotatably mounted to the mounting plate, and a spring element arranged between the mounting plate and the inverse differential gear assembly. In this way, the spring element allows for a pre-loading of the elements of the inverse differential gear assembly. In a particular embodiment having first and second input gears and the connection structure, the spring element may be arranged between the mounting plate and the inverse differential gear assembly in such a way that the first and second input gears and the connection structure are pre-loaded with respect to each other. The spring element allows for a pre-loading of the elements of the inverse differential gear assembly, such that the play of all the couplings between the elements does not sum up and cannot lead to an undesired behavior of the inverse differential gear assembly, in particular when starting to move the light head. The pre-loading may also increase the torque in the direction of the highest loads. The spring element may be any suitable flexible element, such as a spring, a flexible pad, a rubber element or the like. Depending on the design of the inverse differential gear assembly and other power transmission elements, it is also possible that no spring element is provided.

According to a further embodiment, the exterior helicopter light unit further comprises a brake system adapted to impede the rotation of the first and second input gears. This brake system may be associated with the motors, in particular with the motor shafts. It may alternatively associated with the input gears. The brake system allows for a strong locking of a particular position of the movable light head.

According to a further embodiment, the exterior helicopter light unit is a search and/or landing light. Accordingly, the light unit can be a pure search light or a pure landing light or a combined search and landing light. It can have a light source emitting visible and/or infrared light and/or other wavelengths.

According to a further embodiment, the light source may be one or a plurality of LED's. It may also comprise one or more halogen lights.

Exemplary power values for the first and second motors are between 10 and 20 W, in particular around 15 W. The torque output of each of the first and second motors may be between 0.1 and 0.5 Nm, in particular around 0.3 Nm.

Exemplary embodiments of the invention further include a helicopter having at least one exterior helicopter light unit, as described in any of the embodiments above. Above modifications and advantages equally relate to the helicopter.

Exemplary embodiments of the invention further include a method of operating an exterior helicopter light unit, as described in any of the embodiments above, the method comprising the steps of effecting a pure tilting of the movable light head by controlling the first and second motors to rotate the first and second input gears in the same direction with the same rotation speed, and effecting a pure rotating of the movable light head by controlling the first and second motors to rotate the first and second input gears in opposite directions with the same rotation speed. In this way, independent operations of tilting and rotating of the movable light head can be performed.

According to a further embodiment, the method further comprises the step of effecting a combined tilting and rotating of the movable light head by controlling the first and second motors to rotate the first and second input gears with different rotation speeds. This may be achieved both with rotating the first and second input gears in the same direction and in opposite directions, as long as the rotations speeds differ. The difference in rotation speed and the directions of rotation determine which portion of the motor power contributes to rotating the light head and which portion of the motor power contributes to tilting the light head.

In more general words, the method of operating an exterior helicopter light unit, as described in any of the embodiments above, may comprise the steps of effecting a pure tilting of the movable light head by controlling the first motor to rotate in a first rotation direction of the first motor and controlling the second motor to rotate in a first rotation direction of the second motor with the same rotation speeds, and effecting a pure rotating of the movable light head by controlling one of the first and second motors to rotate in the first rotation direction and controlling the other of the first and second motors to rotate in a second rotation direction, opposite the first rotation direction, with the same rotation speeds. In other words, there are two operational modes. In a first operational mode, the rotations of the first and second motors result in a tilting of the light head via the inverse differential gear assembly. In a second operational mode, which differs from the first operational mode by reversing the rotation direction of one of the two motors, the rotations of the first and second motors result in a rotation of the light head via the inverse differential gear assembly. The absolute directions of rotation of the first and second motors in the first and second operational modes may depend on the design of the inverse differential gear assembly and, if present, on the gear structure between the motors and the inverse differential gear assembly.

With the method of operating an exterior helicopter light unit according to exemplary embodiments of the invention, the same advantages can be attained as with the exterior helicopter light unit. This method can be developed further by method steps corresponding to the features as described above with regard to the exterior helicopter light unit. In order to avoid redundancy, such embodiments and modifications of the method of operating the exterior helicopter light unit are not repeated.

Exemplary embodiments of the invention further include an exterior helicopter light unit that has a movable light head comprising a light source, a first motor and a second motor for actuating the movable light head, and a transmission assembly coupling the first and second motors to the movable light head. The transmission assembly comprises a carrier structure, with the first motor being drivingly coupled to the carrier structure for rotation thereof, a rotation input gear, with the second motor being drivingly coupled to the rotation input gear, and a rotation output gear, rotatably coupled to the carrier structure, with the movable light head being in a rotation transmission relationship with the rotation output gear. The carrier structure, the rotation input gear and the rotation output gear are coupled in such a way that a rotation of the carrier structure results in a tilting of the movable light head and that a rotation of the rotation input gear results in a rotation of the rotation output gear, rotating the movable light head.

This exterior helicopter light unit is an alternative to above described exterior helicopter light unit with the inverse differential gear assembly. Its structure also allows for both motors being placed outside of the light head and its mounting structure, e.g. outside the light arm, the motors being in particular arranged in a fixed spatial relationship with the helicopter body and/or a mounting plate. In this way, this alternative embodiment also allows for a lightweight design of the light head and its mounting structure and for the increase in the degrees of freedom for designing the same.

This alternative embodiment of the exterior helicopter light unit can be developed further in the same manner as described above with respect to the exterior helicopter light unit with the inverse differential gear assembly. Above discussed additional features can also be applied to this alternative embodiment of the exterior helicopter light unit. In order to avoid redundancy, such embodiments and modifications of the exterior helicopter light unit are not repeated.

Exemplary embodiments of the invention further include a method of operating above described alternative exterior helicopter light unit, comprising the steps of effecting a pure rotating of the movable light head by controlling the second motor to rotate the rotation input gear, and effecting a pure tilting of the movable light head by controlling the first motor to rotate the carrier structure and by controlling the second motor to force the rotation input gear to counteract a rotation tendency of the rotation output gear induced by the rotation of the carrier structure.

With the method of operating the alternative exterior helicopter light unit according to exemplary embodiments of the invention, the same advantages can be attained as with the exterior helicopter light unit. This method can be developed further by method steps corresponding to the features as described above with regard to the exterior helicopter light unit. In order to avoid redundancy, such embodiments and modifications of the method of operating the exterior helicopter light unit are not repeated.

BRIEF DESCRIPTION OF THE DRAWINGS

Embodiments of the invention are described in greater detail below with reference to the figures, wherein.

DETAILED DESCRIPTION

Figure 1:
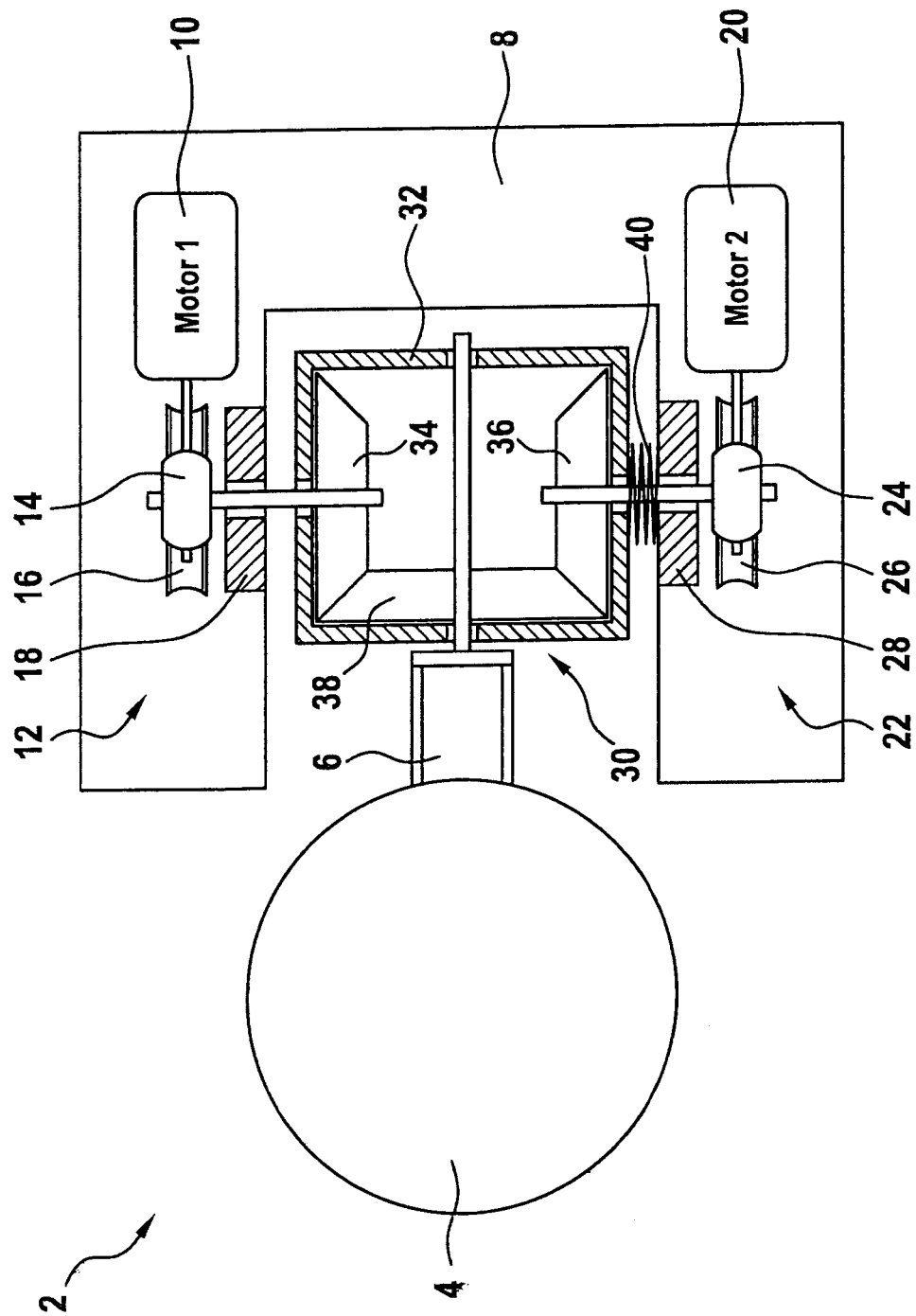
FIG. 1 shows a functional drawing of an exemplary embodiment of an exterior helicopter light unit in accordance with the invention, shown in a partially cut-out top view.

FIG. 1 shows an exterior helicopter light unit 2 in accordance with an exemplary embodiment of the invention. FIG. 1 generally has a top view on the exterior helicopter light unit. When the light unit 2 is in use and mounted to a helicopter, this view corresponds to a viewing direction perpendicular to the portion of the helicopter body to which the light unit 2 is attached. The view of FIG. 1 is denoted partially cut-out, because some of the components are shown in a cross-sectional way. Also, some of the further elements of the light unit 2, such as a housing, are not depicted for an easier focusing on the invention.

The light unit 2 comprises a mounting plate 8, to which a first motor 10 and a second motor 20 are fixedly attached. The mounting plate 8 is the portion of the light unit 2 that is mounted to the helicopter body during the assembly of the whole helicopter. A first support portion 18 and a second support portion 28 are also fixedly attached to the mounting plate 8.

Moreover, a first spur gear 16 and a second spur gear 26 are mounted to the mounting plate 8. However, the first spur gear 16 and the second spur gear 26 can rotate freely with respect to the mounting plate 8. In other words, the first spur gear 16 and the second spur gear 26 are supported on the mounting plate 8 in such a way that their rotation does not effect the orientation of the mounting plate 8.

The motor shaft of the first motor 10 comprises a first worm 14. The first worm 14 is in engagement with the first spur gear 16, such that a rotation of the motor shaft results in a rotation of the first worm 14 and therefore in a rotation of the first spur gear 16. The first worm 14 and the first spur gear 16 make up the first gear assembly 12.

The second motor 20 has a second worm 24. The second worm 24 is in engagement with the second spur gear 26, such that a rotation of the motor shaft results in a rotation of the second worm 24 and therefore of the second spur gear 26. The second worm 24 and the second spur gear 26 make up the second gear assembly 22.

The light unit 2 further comprises an inverse differential gear assembly 30. The inverse differential gear assembly 30 in turn comprises a carrier structure 32, a first input gear 34, a second input gear 36, and a connection structure 38. The carrier structure 32 is a cage in the embodiment of FIG. 1. The cage 32 is generally cube-shaped. It is an enclosed structure, with the exception of the holes for the various rotation shafts, described below. In the drawing of FIG. 1, the cage 32 is shown as a rectangle, i.e. with the top plate being cut off, in order to see the interior thereof. The carrier structure 32 is rotatably coupled to the mounting plate 8. In more general terms, the carrier structure 32 is rotatably coupled to a spatially fixed structure, to which the first motor 10 and the second motor 20 are mounted.

The first input gear 34 and the second input gear 36 provide for the support of the cage 32 in such a way that it can rotate with respect to the mounting plate 8. The first input gear 34 has a bevel gear portion and a shaft portion. The shaft portion corresponds with the axis of rotation of the bevel gear portion, such that the bevel gear portion rotates around the shaft of the first input gear 34. While the bevel gear portion is attached to or integrally formed with the bevel gear portion of the first input gear 34 within the carrier structure 32, the other end of the shaft portion is mounted to the first spur gear 16 in such a way that the first spur gear 16 rotates around the shaft portion of the first input gear 34. The shaft portion of the first input gear 34 is rotatably supported in the first support portion 18 and in the side wall of the cage 32. In this way the rotation of the first input gear 34 is independent from the mounting plate 8. It also does not have a direct effect on the position of the carrier structure 32, only through the connection structure 38, as will be explained below.

The second input gear 36 is analogous to the first input gear 34. The second input gear 36 has a bevel gear portion and a shaft portion. The shaft portion corresponds with the axis of rotation of the bevel gear portion, such that the bevel gear portion rotates around the shaft of the second input gear 36. While the bevel gear portion is attached to or integrally formed with the bevel gear portion of the second input gear 36 within the carrier structure 32, the other end of the shaft portion is mounted to the second spur gear 26 in such a way that the second spur gear 26 rotates around the shaft portion of the second input gear 36. The shaft portion of the second input gear 36 is rotatably supported in the second support portion 28 and in the side wall of the cage 32. In this way the rotation of the second input gear 36 is independent from the mounting plate 8. It also does not have a direct effect on the position of the carrier structure 32, only through the connection structure 38, as will be explained below.

The connection structure 38 also has a bevel gear portion and a shaft portion. The bevel gear portion is in engagement with the bevel gear portions of the first input gear 34 and the second input gear 36. The shaft portion of the connection structure 38 is supported in two side walls of the cage 32. In this way, the connection structure 38 can rotate freely in the cage 32. In other words, a rotation of the connection structure 38 can occur independent from any motion of the carrier structure 32.

The light unit 2 further comprises a light head 4 and a light arm 6. The light head 4 is mounted to the light arm 6 and contains a light source. In most embodiments, the light head 4 comprises a light source surrounded by an optical element, such as a lens, for shaping the distribution, intensity, colour, etc. of the emitted light. The light arm 6 is attached to the shaft portion of the connection structure 38. In this way, a rotation of the shaft portion of the connection structure 38 results in a rotation of the light arm 6 and therefore of the light head 4. As the shaft portion of the connection structure 38 is rotatably supported in spatially fixed locations of the carrier structure 32, a rotation of the carrier structure 32 results in a tilting of the light arm 6 and therefore of the light head 4 into and out of the drawing plane.

The light unit 2 further comprises a spring 40. The spring 40 is arranged between the second support portion 28 and the carrier structure 32. It is further arranged around the shaft portion of the second input gear 36. In this position, it pre-loads the engagement between the bevel gear portion of the second input gear 36, the bevel gear portion of the connection structure 38 and the bevel gear portion of the first input gear 34. With this pre-loaded engagement, the torque of the first and second motors 10, 20 can be transferred well to the rotation or tilting of the light head 4.

The operation of the exterior helicopter light unit 2 is described as follows. When the shafts of the first motor 10 and the second motor 20 are driven in the same direction with the same rotational speed, this translates to a rotation of the first input gear 34 and the second input gear 36 in the same direction and a tilting of the light arm 6 and the light head 4. A rotation of the first input gear 34 and the second input gear 36 in the same direction is defined as a rotation in the same direction, when seen from a fixed point of view outside of the light unit 2. In other words, a rotation of the first input gear 34 and the second input gear 36 in the same direction is a rotation that does not lead to a rotation of the connection structure 38.

In particular, the driving of the motor shaft of the first motor 10 results in a rotation of the first worm 14, which results in a rotation of the first spur gear 16, which in turn results in a rotation of the first input gear 34, in particular of the bevel gear portion thereof. The rotation of the motor shaft of the second motor 20 results in a rotation of the second worm 24, which results in a rotation of the second spur gear 26, which in turn results in a rotation of the second input gear 36, in particular of the bevel portion thereof. With the first input gear 34 and the second input gear 36 rotating in the same direction with the same rotational speed, no rotational force around its shaft portion is applied to the connection structure 38. To the contrary, the rotation of the first input gear 34 and the second input gear 36 translates into a rotation of the entire connection structure 38 around the axes of the first input gear 34 and the second input gear 36. This rotation results in a tilting of the shaft portion of the connection structure 38, of the light arm 6, and of the light head 4 with respect to the mounting plate 8, and therefore with respect to the helicopter body.

When the first and second motors 10, 20 drive the motor shafts in different directions with the same speed of rotation, the light arm 6 and light head 4 rotates. On the basis of the transmission of rotation described above, the first input gear 34 and the second input gear 36 rotate in opposite directions when the motor shafts of the first motor 10 and the second motor 20 rotate in opposite directions. With the first and second motors 10, 20 and the first and second gear assemblies 12, 22 being identical, the first input gear 34 and the second input gear 36 exert the same amount of torque on the connection structure 38. Both of these torques exert a force on the connection structure 38, making it rotate around its shaft portion. In other words, the torques of the first input gear 34 and the second input gear 36 add up in order to rotate the connection structure 38 around its shaft portion. The rotation of the connection structure 38 results in a rotation of the light arm 6 and the light head 4. The carrier structure 32 maintains its position during this rotation of the light arm 6 and the light head 4.

In this way, the first and second motors 10, 20 can be controlled to effect a tilting of the light head 4 or a rotation of the light head 4. As the light head 4 has given light emission characteristics comprising a particular spatial light emission distribution, the tilting and rotation of the light head 4 allows for altering this light emission distribution. In particular, the emission direction of a light beam, emitted by the light head 4, can be altered in three dimensions via tilting and rotating of the light head 4.

It is also possible to tilt and rotate the light arm 6 and the light head 4 at the same time. The average of the rotation speeds of the first and second input gears 34, 36 determines the amount of tilting, while the difference of the rotation speeds of the first and second input gears 34, 36 determines the amount of rotation. For these calculations, the sign and value of the rotation speeds have to be taken into account. The effects of different rotation speeds can also be expressed differently. When looking only at the absolute values of the rotation speeds of the first and second input gears, the common part, i.e. the rotation speed of the slower input gear, transfers to a pure tilting or rotating motion (tilting if the directions of rotation are the same, rotating otherwise). The difference between the absolute values of the rotation speeds transfers to a diagonal motion, i.e. a combined tilting and rotating motion. Suitable control of the light head may be provided on the basis of these interdependencies.

The inverse differential gear assembly 30 has many elements of conventional bevel differential gears. However, the use of these elements and the power flow through the differential gear are entirely different. In conventional uses of bevel differential gears, such as in cars, the carrier structure 32 is the part driven by the car engine. Accordingly, the cage 32 would be the power input element. The axes of the car are commonly attached to the shafts of those elements that are denoted the first input gear 34 and the second input gear 36 in the present invention. Accordingly, those elements are the output elements in conventional uses of a bevel differential gear. In the embodiment of FIG. 1, the first and second motors 10, 20 drive the first input gear 34 and the second input gear 36, making them the power input elements of the inverse differential gear 30. Because of this inverse power flow, as compared to conventional uses, the element 30 is referred to as inverse differential gear assembly.

Figure 2:
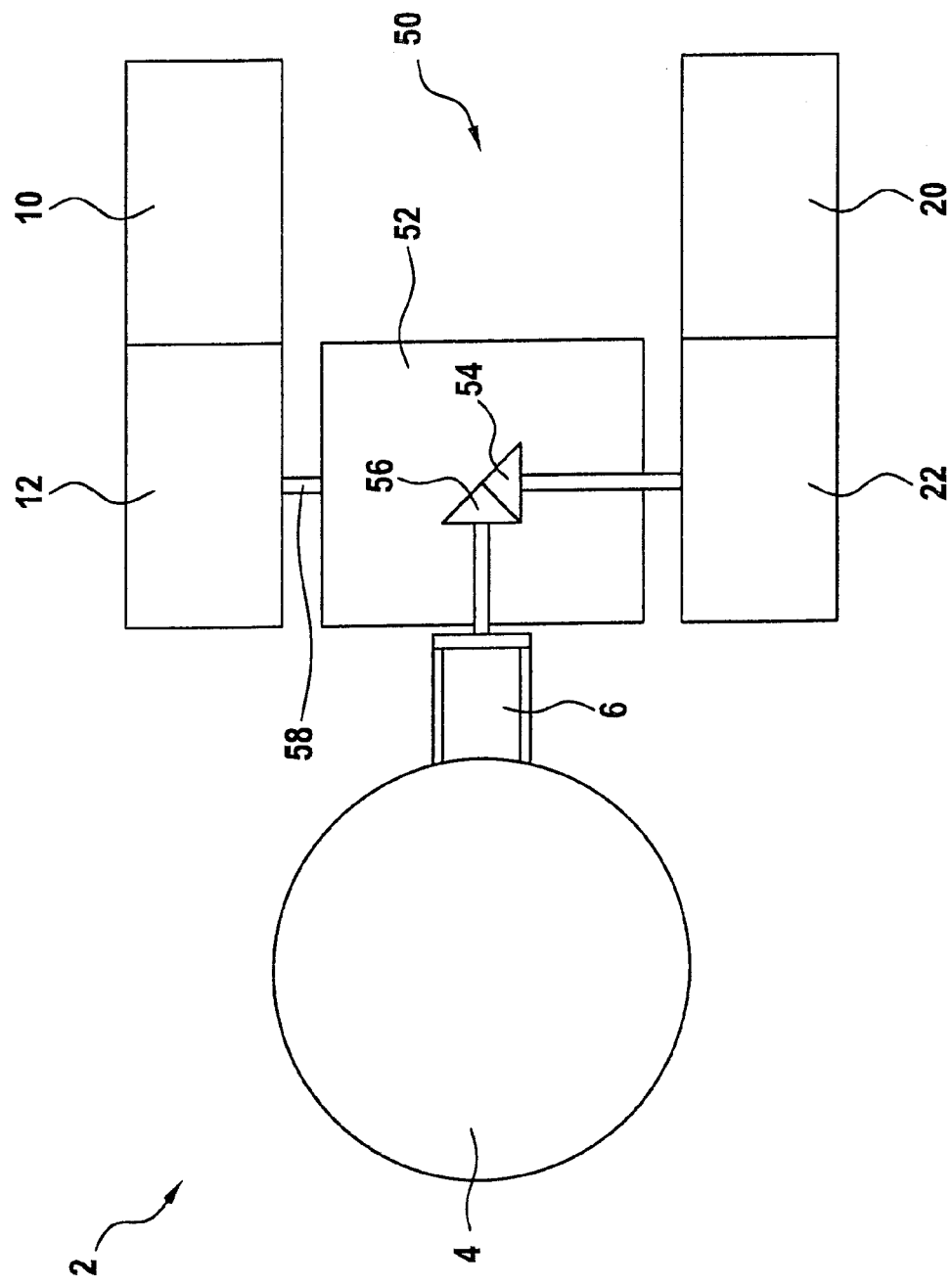
FIG. 2 shows a functional drawing of a further exemplary, alternative embodiment of an exterior helicopter light unit in accordance with the invention, shown in a partially cut-out top view.

FIG. 2 shows a functional drawing of an exterior helicopter light unit 2 in accordance with an alternative exemplary embodiment of the invention. FIG. 2 also shows a cut-out top view. Elements identical to the elements of FIG. 1 are denoted with the same reference numerals. A description thereof is omitted for brevity. Also, the mounting plate 8, the first and second support portions 18, 28 and the spring 40 are not shown for an easier readability.

Instead of the inverse differential gear assembly 30 of the embodiment of FIG. 1, the embodiment of FIG. 2 has a transmission assembly 50. The transmission assembly 50 has a carrier structure 52, a rotation input gear 54 and a rotation output gear 56. The carrier structure 52 is a cage that is rotatably coupled to a fixed mounting portion, such as the mounting plate 8, which holds the first and second motors 10, 20 and the first and second gear assemblies 12, 22. A tilting shaft 58 is coupled between the first gear assembly 12 and the carrier structure 52. In particular, the tilting shaft 58 forms a rotational shaft of the first spur gear 16 and is fixedly attached to the carrier structure 52. In this way, the first motor can drive the tilting shaft 58, resulting in a rotation of the carrier structure 52, which in turn results in a tilting of the light arm 6 and the light head 4.

The rotation input gear 54 comprises a shaft portion and a bevel gear portion. Also, the rotation output gear 56 comprises a shaft portion and a bevel gear portion. The bevel gear portions of the rotation input gear 54 and the rotation output gear 56 are both disposed within the carrier structure 52 and are in engagement with each other. Accordingly, a rotation of one of the rotation input gear 54 and the rotation output gear 56 results in a rotation of the respectively other element. The shaft portion of the rotation input gear 54 forms the shaft of the second spur gear 26 of the second gear assembly 22. The shaft portion of the rotation output gear 56 is attached to the light arm 6. In this way, the second motor 20 drives in operation the rotation input gear 54, which in turn rotates the rotation output gear 56. In this way, a driving of the second motor 20 results in a rotation of the light arm 6 and the light head 4.

It is pointed out that a tilting of the light arm 6 and the light head 4 by a driving of the first motor 10 may result in an undesired rotation of the light head 4 and the light arm 6. This is because a rotation of the carrier structure 52, which results in tilting of the light head 4, exerts a force on the engagement between the rotation input gear 54 and the rotation output gear 56. Therefore, if the rotation input gear 54 and the rotation output gear 56 are allowed to rotate freely in a situation where the first motor 10 drives the tilting shaft 58, the light head 4 and the light arm 6 will rotate. In order to effect a pure tilting and prevent such a rotation, it is possible to control the second motor 20 to exert a counter force, keeping the rotation input gear 54 from turning. It is also possible to lock the position of the rotation input gear 54 via a brake mechanism.

While the invention has been described with reference to exemplary embodiments, it will be understood by those skilled in the art that various changes may be made and equivalence may be substituted for elements thereof without departing from the scope of the invention. In addition, many modifications may be made to adapt a particular situation or material to the teaching of the invention without departing from the essential scope thereof. Therefore, it is intended that the invention not be limited to the particular embodiments disclosed, but that the invention will include all embodiments falling within the scope of the appended claims.

The invention claimed is:

1. An Exterior helicopter light unit, comprising:
    a movable light head comprising a light source,
    a first motor and a second motor for actuating the movable light head, and
    an inverse differential gear assembly coupling the first and second motors to the movable light head in such a way that the first and second motors can tilt and rotate the movable light head in operation,
    wherein the inverse differential gear assembly is a bevel differential gear assembly and comprises:
        a carrier structure, which comprises a cage,
        a first input gear and a second input gear, wherein the first input gear comprises a first bevel gear and the second input gear comprises a second bevel gear, each of the first and second input gears rotatably coupled to the carrier structure, with the first motor being drivingly coupled to the first input gear and the second motor being drivingly coupled to the second input gear,
        a connection structure, rotatably coupled to the carrier structure and coupling the first and second input gears to each other, wherein the connection structure comprises a third bevel gear and wherein the third bevel gear is in engagement with the first and second bevel gears, with the movable light head being in a rotation transmission relationship with the connection structure,
    wherein the carrier structure, the first and second input gears, and the connection structure are coupled in such a way that:
        a rotation of the first and second input gears in the same direction results in a rotation of the carrier structure, tilting the movable light head, and
        a rotation of the first and second input gears in opposite directions results in a rotation of the connection structure, rotating the movable light head.

2. The Exterior helicopter light unit according to claim 1, wherein the movable light head is fixedly coupled to the connection structure via a light arm.

3. The Exterior helicopter light unit according to claim 1, wherein the first motor is drivingly coupled to the first input gear via a first gear assembly and wherein the second motor is drivingly coupled to the second input gear via a second gear assembly, wherein the first gear assembly comprises a first worm, fixedly coupled to a motor shaft of the first motor, and a first spur gear, fixedly coupled to the first input gear and in engagement with the first worm, and
the second gear assembly comprises a second worm, fixedly coupled to a motor shaft of the second motor, and a second spur gear, fixedly coupled to the second input gear and in engagement with the second worm.

4. The Exterior helicopter light unit according to claim 1, having a symmetric design with the first motor and the second motor being identical motors.

5. The Exterior helicopter light unit claim 1, wherein the first and second motors are servo motors.

6. The Exterior helicopter light unit claim 1, wherein a motor shaft of the first motor and a motor shaft of the second motor are substantially parallel, with the motor shaft of the first motor and the motor shaft of the second motor being parallel to a tilting plane, defined by a rotation axis of the connection structure in various tilting states and with a rotation axis of the first input gear and a rotation axis of the second input gear being in a plane substantially orthogonal to the motor shafts of the first and second motors respectively.

7. The Exterior helicopter light unit claim 1, further comprising
    a mounting plate, with the first and second motors being fixedly mounted to the mounting plate and the inverse differential gear assembly being rotatably mounted to the mounting plate, and
    a spring element arranged between the mounting plate and the inverse differential gear assembly in such a way that the first and second input gears and the connection structure are pre-loaded with respect to each other.

8. The Exterior helicopter light unit according to claim 1, wherein the exterior helicopter light unit is a search and/or landing light.

9. A Method of operating an exterior helicopter light unit according to claim 1, comprising the steps of:
    effecting a pure tilting of the movable light head by controlling the first and second motors to rotate the first and second input gears in the same direction with the same rotation speed, and
    effecting a pure rotating of the movable light head by controlling the first and second motors to rotate the first and second input gears in opposite directions with the same rotation speed.

10. The Method according to claim 9, further comprising the step of:
    effecting a combined tilting and rotating of the movable light head by controlling the first and second motors to rotate the first and second input gears with different rotation speeds.

11. An Exterior helicopter light unit, comprising:
    a movable light head comprising a light source,
    a first motor and a second motor for actuating the movable light head, and
    a transmission assembly coupling the first and second motors to the movable light head, the transmission assembly comprising:
        a carrier structure, which comprises a cage, with the first motor being drivingly coupled to the carrier structure for rotation thereof,
        a rotation input gear, which comprises a first bevel gear, with the second motor being drivingly coupled to the rotation input gear, and
        a rotation output gear, which comprises a second bevel gear, rotatably coupled to the carrier structure, with the movable light head being in a rotation transmission relationship with the rotation output gear, wherein the first bevel gear and the second bevel gear are arranged within the cage and are in engagement with each other, wherein the carrier structure, the rotation input gear and the rotation output gear are coupled in such a way that a rotation of the carrier structure results in a tilting of the movable light head, and a rotation of the rotation input gear results in a rotation of the rotation output gear, rotating the movable light head.

12. A Method of operating an exterior helicopter light unit according to claim 11, comprising the steps of:

effecting a pure rotating of the movable light head by controlling the second motor to rotate the rotation input gear, and effecting a pure tilting of the movable light head by controlling the first motor to rotate the carrier structure and by controlling the second motor to force the rotation input gear to counteract a rotation tendency of the rotation output gear induced by the rotation of the carrier structure.

13. The Exterior helicopter light unit according to claim 11, wherein the movable light head is fixedly coupled to the connection structure via a light arm.

14. The Exterior helicopter light unit claim 11, wherein the first and second motors are servo motors.

15. The Exterior helicopter light unit claim 11, wherein a motor shaft of the first motor and a motor shaft of the second motor are substantially parallel, with the motor shaft of the first motor and the motor shaft of the second motor being parallel to a tilting plane, defined by a rotation axis of the connection structure in various tilting states and with a rotation axis of the first input gear and a rotation axis of the second input gear being in a plane substantially orthogonal to the motor shafts of the first and second motors respectively.

16. The Exterior helicopter light unit claim 11, further comprising a mounting plate, with the first and second motors being fixedly mounted to the mounting plate and the inverse differential gear assembly being rotatably mounted to the mounting plate, and a spring element arranged between the mounting plate and the inverse differential gear assembly in such a way that the first and second input gears and the connection structure are pre-loaded with respect to each other.

17. The Exterior helicopter light unit according to claim 11, wherein the exterior helicopter light unit is a search and/or landing light.

* * * * *